(12) United States Patent
Ram et al.

(10) Patent No.: US 11,359,137 B2
(45) Date of Patent: Jun. 14, 2022

(54) MICROENCAPSULATED THERMOCHROMIC MATERIALS AND USES THEREOF

(71) Applicant: UNIVERSITY OF SOUTH FLORIDA, Tampa, FL (US)

(72) Inventors: Manoj Kumar Ram, Palm Harbor, FL (US); Elias K. Stefanakos, Tampa, FL (US)

(73) Assignee: UNIVERSITY OF SOUTH FLORIDA, Tampa, FL (US)

(*) Notice: Subject to any disclaimer, the term of this patent is extended or adjusted under 35 U.S.C. 154(b) by 250 days.

(21) Appl. No.: 16/610,107

(22) PCT Filed: May 3, 2018

(86) PCT No.: PCT/US2018/030886
§ 371 (c)(1),
(2) Date: Nov. 1, 2019

(87) PCT Pub. No.: WO2018/204640
PCT Pub. Date: Nov. 8, 2018

(65) Prior Publication Data
US 2020/0079993 A1 Mar. 12, 2020

Related U.S. Application Data

(60) Provisional application No. 62/500,669, filed on May 3, 2017.

(51) Int. Cl.
*B32B 5/16* (2006.01)
*C09K 9/02* (2006.01)
(Continued)

(52) U.S. Cl.
CPC .......... *C09K 9/02* (2013.01); *B01J 13/06* (2013.01); *B01J 19/122* (2013.01); *C04B 14/36* (2013.01);
(Continued)

(58) Field of Classification Search
CPC ...... Y10T 428/2991–2993; C09D 5/26; C09D 7/41; C09D 17/002–004; C09D 17/008;
(Continued)

(56) References Cited

U.S. PATENT DOCUMENTS

| 5,431,697 A | 7/1995 | Kamata et al. |
| 5,480,482 A | 1/1996 | Novinson |

(Continued)

FOREIGN PATENT DOCUMENTS

| JP | 2010132822 | 6/2010 |
| WO | 2016046216 | 3/2016 |

OTHER PUBLICATIONS

Li et al., "Core-shell VO2@TiO2 nanorods that combine thermochromic and photocatalytic properties for application as energy-saving smart coatings," 2013, Scientific Reports. 3:1370 (13pp).

(Continued)

*Primary Examiner* — Hoa (Holly) Le
(74) *Attorney, Agent, or Firm* — Quarles & Brady LLP; Yakov Sidorin

(57) ABSTRACT

A variety of particles forming microencapsulated thermochromic materials are provided. The particles can include a thermochromic core and a metal oxide shell encapsulating the thermochromic core. The thermochromic core can include one or both of an organic thermochromic material and an inorganic salt thermochromic material. In some aspects, the particles include a dye selected from a crystal violet lactone dye, a fluoran dye, and a combination thereof. In still further aspects, the particles include a color developer (Continued)

selected from a hydroxybenzoate, a 4, 4'-dihydroxydiphenyl propane, a hydroxycoumarin derivative, a lauryl gallate, and a combination thereof. In some aspects, the metal oxide shell is a $TiO_2$ shell. The particles can be used in cements and paints and for a variety of building materials. Methods of making the particles and building materials and methods of use, for example, for removing a volatile organic carbon from a building material, are also provided.

22 Claims, 6 Drawing Sheets

(51) Int. Cl.
  B01J 13/06      (2006.01)
  B01J 19/12      (2006.01)
  C04B 14/36      (2006.01)
  C04B 16/00      (2006.01)
  C04B 20/10      (2006.01)
  C04B 26/02      (2006.01)
  C04B 28/04      (2006.01)
(52) U.S. Cl.
  CPC .......... C04B 16/00 (2013.01); C04B 20/1066 (2013.01); C04B 26/02 (2013.01); C04B 28/04 (2013.01); B01J 2219/0879 (2013.01); B01J 2219/0892 (2013.01); B01J 2219/1203 (2013.01)
(58) Field of Classification Search
  CPC ........... C09B 9/00; C09B 11/00; C04B 22/00; C04B 22/06; C04B 24/24
  USPC ................................................. 428/403–406
  See application file for complete search history.

(56) References Cited

U.S. PATENT DOCUMENTS

| | | | |
|---|---|---|---|
| 5,721,059 | A | 2/1998 | Kito et al. |
| 6,413,305 | B1 | 7/2002 | Mehta et al. |
| 6,494,950 | B1 | 12/2002 | Fujita et al. |
| 6,872,453 | B2 | 3/2005 | Arnaud et al. |
| 7,304,008 | B2 * | 12/2007 | Belykh ...................... C03C 8/00 374/E11.02 |
| 9,493,695 | B2 | 11/2016 | Ram et al. |
| 2009/0047474 | A1 * | 2/2009 | Gross ...................... C04B 41/52 428/144 |
| 2009/0301382 | A1 | 12/2009 | Patel |
| 2016/0168385 | A1 * | 6/2016 | Barbé ................. C09B 67/0097 106/490 |
| 2016/0297975 | A1 | 10/2016 | Yu et al. |
| 2017/0306221 | A1 * | 10/2017 | Koole .................. C09D 183/04 |
| 2019/0142713 | A1 * | 5/2019 | Ribi .......................... A61K 8/11 424/59 |

OTHER PUBLICATIONS

Brook et al., "Novel: multifunctional films," 2007, Surface and Coatings Technology, 201:9373-9377.
Chen et al., "Crystallised mesoporous TiO2(A)-VO2( M/R) nanocomposite films with self-cleaning and excellent thermochromic properties," 2014, J. Materials Chemistry A, 2:11874-11884.
International Search Report for PCT/US18/30886 dated Jul. 20, 2018, 3pp.
Written Opinion for PCT/US18/30886 dated Jul. 20, 2018, 5pp.
Burkinshaw, S.M. et al., "Reversibly thermochromic systems based on pH-sensitive spirolactone-derived functional dyes" 1998, J. Mater. Chem, 8:2677-2683.
Synnefa, A. et al., "On the development, optical properties and thermal performance of cool colored coatings for the urban environment," 2007, Solar Energy, 81:488-497.
Synnefa, A. et al., "Estimating the effect of using cool coatings on energy loads and thernal comfort in residential buildings in various climatic conditions," 2007, Energy and Buildings, 39:1167-1174.
Boh, B. et al., "Microencapsulation technology and its applications in building construction materials," 2008, RMZ—Materials and Geoenvironment, 55:329-344.
Bhattacharya, R. et al., "Synthesis, crystal structure and thermochromism of benzimidazolium tetrachlorocuprate: (C7H7N2)2[CuCl4]," 2002, Polyhedron, 21:2561-2565.
Synnefa, A. et al., "An energy efficient solution to mitigate heat islands and reduce cooling energy loads." 2007, Proceedings of the International Conference on Sustainable Buildings, 8pp.
Snak, M., "Will AC put a chill on the global energy supply? Several developing nations could soon lead the world in use of air-conditioning." 2013, Arerican Scientist, vol. 101, 3pp.
Synnefa, A. et al., "A study of thermal performance of reflective coatings for the urban environment," 2006, Solar energy, 80:968-981.
Seeboth, A., et al., "Thermochromic effects of leuco dyes studied in polypropylene," 2006, Chinese J. Polymer Sci., 24:363-368.
Oda, H., "New developments in the stabilization of leuco dyes: effect of UV absorbers containing an amphoteric counter-ion moiety on the light fastness of color formers," 2005, Dyes and Pigments, 66:103-108.
Kiri, P. et al., "Solid state thermochromic materials," 2010, Adv. Mat. Lett., 1:86-105.
Maclaren, D.C. et al., "Design rules for reversible thermochromic mixtures," 2005, J. Mat. Sci., 40:669-676.
Ma, Y. et al., "Preparation and solar reflectance spectra of chameleon-type building coatings," 2001, Solar Energy, 70:417-422.
Maclaren, D.C. et al., "Competition between dye-developer and solvent-developer interactions in a reversible thermochromic system," 2003, J. Mater. Chem, 13:1701-1704.
Mauguet, M.C. et al., "Gliadin matrices for microencapsulation processes by simple coacervation method," 20092 J. Microencapsulation, 19:377-384.
Mo, J. et al., "Influence of fins on formaldehyde removal in annular photocatalytic reactors," 2008, Building and Environment, 43:238-245.
Maclaren, D.C et al., "Dye-developer interactions in the crystal violet lactone-lauryl gallate binary system: implications for thermochromism," 2003, J. Mater. Chem., 13:1695-1700.
Ma, Y. at al., "Research on the preparation of reversibly thermochromic cement based materials at normal temperature," 2009, Cement and Concrete Research, 39:90-94.
Oda, H., "Photostabilization of organic thermochromic pigments. Part 2: Effect of hydroxyarylbenzotriazoles containing an amphoteric counter-ion moiety on the light fastness of color formers," 2008, Dyes and Pigments, 76:400-405.
Naito, K. "amorphous-crystal transition of organic dye assemblies: application to rewritable color recording media," 1995, Appl. Phys. Lett., 67:211-213.
Perucchi, A. et al., "Optical properties across the insulator to metal transitions in vanadium oxide compounds," 2009, J. Phys.: Condens. Matter, 21, 17pp.
Kulcar, R. et al., "Colorimetric properties of reversible thermochromic printing inks," 2010, Dyes and Pigments, 86:271-277.
Karlessi, T. et al., "Development and testing of thermochromic coatings for buildings and urban structures," 2009, Solar Energy, 83:538-551.
Karlessi, T. et al., "Thermochromic energy efficient coatings for buildings and urban structures," 2009, Second International Conference on Countermeasures to Urban Heat Islands, 21pp.
Held, K. et al., "Mott-Hubbard Metal-Insulator Transition in Paramagnetic V2O3: An LDA + DMFT(QMC) Study," 2001, Physical Rev. Lett., 86:5345-5348.
Santamouris, M. et al., "Using advanced cool materials in the urban built environment to mitigate heat islands and improve thermal comfort conditions," 2011, Solar Energy, 85:3085-3102.
Ram, M.K. et al., "Microencapsulated dimethyl terephthalate phase change material far heat transfer fluid performance enhancement," 2017, Int. J. Energy Res., 41:252-262.

(56) References Cited

OTHER PUBLICATIONS

Coser, E. et al., "Development of paints with infrared radiation reflective properties," 2015, Polimeros, 25:305-310.
Granqvist. C.G., "Window coatings for the future," 1990, Thin Solid Films, 193/194:730-741.

\* cited by examiner

MICROENCAPSULATED THERMOCHROMIC MATERIALS AND USES THEREOF

CROSS-REFERENCE TO RELATED APPLICATIONS

This application claims priority to, and the benefit of, U.S. provisional application entitled "MICROENCAPSULATED THERMOCHROMIC MATERIALS AND USES THEREOF" having Ser. No. 62/500,669, filed May 3, 2017, the contents of which are incorporated by reference in their entirety.

TECHNICAL FIELD

The present disclosure generally relates to thermochromic materials and uses thereof.

BACKGROUND

Buildings use almost 40% of the world's energy and are responsible for about 70% of emitted sulphur oxides and 50% of $CO_2$ [1]. In the US alone, air-conditioning use has increased substantially with 87% of homes already being air-conditioned with 185 billion kilowatt hours of energy expended annually for residential cooling [2]. Many cities around the world suffer from the urban heat island (cluster of buildings) effect with an average daylight temperature greater than 3° C. compared to rural areas [3-6]. There is great need to develop a technology that can be used to regulate the surface optical properties of coatings (paint) or building materials with temperature and solar radiation [7, 8]. The optical properties of a thermochromic material reversibly change as the temperature changes. The change in the color of a thermochromic material occurs due to change in doping or change in the proton-donor or electron acceptor concentrations in the thermochromic composition. The thermochromic material also changes its atomic arrangement as the temperature changes, due to the neutral or acidic conditions in the molecular environment. Thermochromic materials find applications in temperature sensors, thermometers and in improving the energy efficiency of buildings [9, 10]. Studies of microencapsulated thermochromic materials for cooling of buildings and urban structures have been previously reported in the literature [6, 7, 11-15].

SUMMARY

In various aspects, particles are provided including a thermochromic core and a metal oxide shell encapsulating the thermochromic core. The thermochromic core can include, for example, an organic thermochromic material or an inorganic salt thermochromic material. The metal oxide shell can protect the thermochromic core and, in some aspects, can provide useful catalytic properties. As one example, a titanium oxide shell can provide for the photocatallyitc decomposition of organic materials.

In some aspects, a particle is provided having a thermochromic core containing an organic thermochromic material; and a shell containing $TiO_2$. The organic thermochromic material can include (i) a dye such as crystal violet lactone, a fluoran dye, or a combination thereof; (ii) a color developer such as a hydroxybenzoate, a 4, 4'-dihydroxydiphenyl propane, a hydroxycoumarin derivative, a lauryl gallate, or a combination thereof; and (iii) a solvent such as alcohol, phenol, ester, or a mixture thereof.

In some aspects, a particle is provided including a thermochromic core containing an inorganic salt thermochromic material; and a shell containing $TiO_2$. The inorganic salt thermochromic material can include silver mercury iodide, cuprous mercury iodide, bis(diethylammonium) tetrachloronickelate, benzimidazolium tetrachlorocuprate, or a combination thereof.

In some aspects, the core includes an organic thermochromic material. Organic thermochromic materials can include a dye, a color developer, and a solvent. Suitable dyes can include, but are not limited to, a crystal violet lactone dye, a fluoran dye, or a combination thereof. Suitable color developers can include, but are not limited to, a hydroxybenzoate, a 4, 4'-dihydroxydiphenyl propane, a hydroxycoumarin derivative, a lauryl gallate, or a combination thereof. Suitable solvents can include, but are not limited to, alcohol, phenol, ester, or a mixture thereof.

The particles can include a variety of metal oxide shell materials. For example, suitable metal oxides can be titanium dioxide ($TiO_2$), zinc oxide (ZnO), silicon oxide ($SiO_2$), tungsten oxide ($WO_3$), manganese oxide ($MnO_2$), indium oxide ($In_2O_3$), aluminum oxide ($Al_2O_3$), iron oxide ($Fe_2O_3$), molybdenum oxide ($MoO_2$), or a combination thereof.

The particles can be made having a variety of sizes. The particles can be nanoparticles or microparticles. In some aspects, the particles are microparticles having a diameter of about 2 µm to 10 µm.

Methods of making the particles are also provided. The methods can include dispersing a thermochromic material using a surfactant to form an aqueous dispersion, and adding a metal isopropoxide and a base to the dispersion to convert the metal isopropoxide into a corresponding metal oxide, thereby forming the particle having the thermochromic material in a core of the particle and the metal oxide in a shell encapsulating the core. Suitable surfactants can include quaternary ammonium surfactant such as cetyltrimethylammonium bromide. The dispersion can be created by forming a first solution containing the thermochromic material, surfactant, and an organic solvent such as 2-propanol; and combining the first solution with water to form the aqueous dispersion comprising the thermochromic material, surfactant, and organic solvent dispersed within the water. Converting the metal isopropoxide into the corresponding metal oxide can include reacting the metal isopropoxide and the base for a period of time from about 6 hours to 36 hours. Suitable bases can include, but are not limited to, ammonia and sodium hydroxide.

Compositions containing the particles are also provided. The compositions can include a plurality of the particles dispersed in a suitable binder. A variety of binders might be used depending upon the application. In some aspects, the binder includes a hydraulic or cementitious binder. For example, the binder can include Portland cement, high alumina cement, calcium aluminate cement, calcium sulfoaluminate cement, magnesium phosphate cement, magnesium potassium phosphate cement, activated fly ash, activated clay, or slag cement. In some aspects, the binder can include a polymeric resin. Suitable polymeric resins can include an acrylic polymer resin, an alkyd polymer resin, an epoxy polymer resin, or a combination thereof. The compositions can include one or more additives as for example, a filler, a pigment, an extender, a solvent, a dispersant, a silicone, a drying agent, a bactericide, a fungicide, an algaecide, an anti-foaming agent, or a combination thereof. The particles and compositions thereof can be used to make a variety of building materials such as cement based paints, roof tiles, or cement based concrete.

Methods of using the particles and compositions are also provided. For example, a method of cleaning a building or other surface are provided. The methods can include removing volatile organic carbons from the material. By radiating a composition or particle provided herein with a light source, the metal oxide can be excited to produce a radical. The radical can react with the volatile organic carbon to oxidize the volatile organic carbon, for example, to produce $H_2O$, $CO_2$, a combination thereof, or a combination thereof with one or more additional decomposition products. The excitation can be promoted by ultraviolet radiation, for example UV light contained in solar radiation. The ultraviolet radiation can excite the metal oxide, such as $TiO_2$, to produce radical species such as $.OH$, $.O_2^-$, or a combination thereof.

Other systems, methods, features, and advantages of particles and methods of making and using thereof will be or become apparent to one with skills in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

(FIG. 1A) night time (FIG. 1B) daytime.

DETAILED DESCRIPTION

Figure 1A:
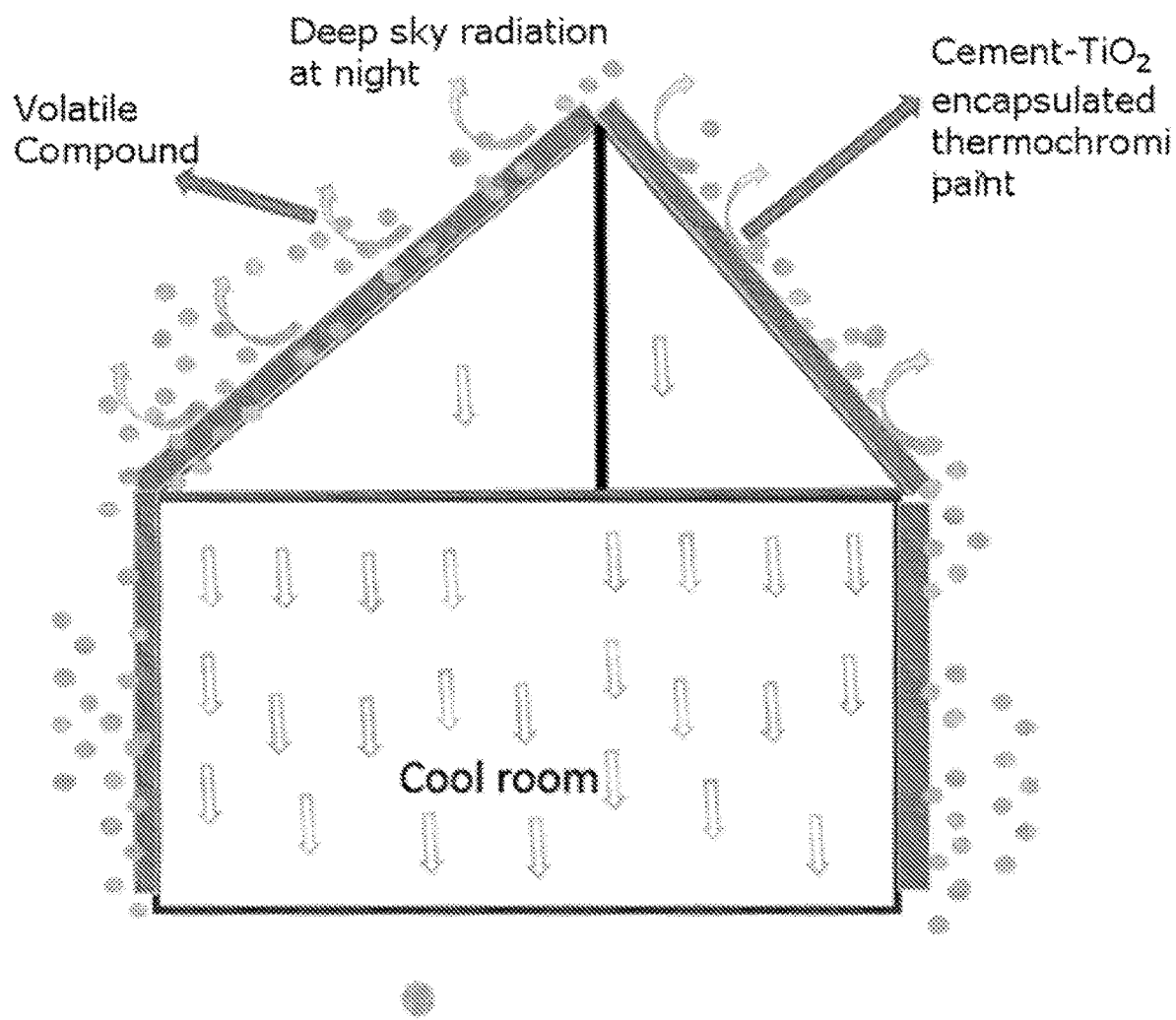
FIGS. 1A-1B show a building's roof and walls coated with cement-$TiO_2$ paint.

In various aspects, particles are provided including a thermochromic material in the core and a metal oxide shell encapsulating the core. Methods of making and methods of using the particles and compositions thereof are also provided.

Before the present disclosure is described in greater detail, it is to be understood that this disclosure is not limited to the particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and be encompassed by the claims herein.

All publications and patents cited in this specification are cited to disclose and describe the methods and/or materials in connection with which the publications are cited. All such publications and patents are herein incorporated in the references, as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Particles and Compositions Thereof

In various aspects, particles are provided including a thermochromic core and a metal oxide shell encapsulating the thermochromic core. The thermochromic core can include, for example, an organic thermochromic material or an inorganic salt thermochromic material. The metal oxide shell can protect the thermochromic core and, in some aspects, can provide useful catalytic properties. As one example, a titanium oxide shell can provide for the photocatallyitc decomposition of organic materials.

In some aspects, a particle is provided having a thermochromic core containing an organic thermochromic material; and a shell containing $TiO_2$. The organic thermochromic material can include (i) a dye selected such as a crystal violet lactone dye, a fluoran dye, or a combination thereof; (ii) a color developer such as a hydroxybenzoate, a 4, 4'-dihydroxydiphenyl propane, a hydroxycoumarin derivative, a lauryl gallate, or a combination thereof; and (iii) a solvent such as an alcohol, a phenol, an ester, or a mixture thereof.

In some aspects, a particle is provided including a thermochromic core containing an inorganic salt thermochromic material; and a shell containing $TiO_2$. The inorganic salt thermochromic material can include a silver mercury iodide, cuprous mercury iodide, bis(diethylammonium) tetrachloronickelate, benzimidazolium tetrachlorocuprate, or a combination thereof.

In some aspects, the core includes an organic thermochromic material. Organic thermochromic materials can include a dye, a color developer, and a solvent. Suitable dyes can include, but are not limited to, a crystal violet lactone dye, a fluoran dye, or a combination thereof. Suitable color developers can include, but are not limited to, a hydroxybenzoate, a 4, 4'-dihydroxydiphenyl propane, a hydroxycoumarin derivative, a lauryl gallate, or a combination thereof. Suitable solvents can include, but are not limited to, an alcohol, a phenol, an ester, or a mixture thereof.

The particles can include a variety of metal oxide shell materials. Suitable metal oxides can include, for example, $TiO_2$, ZnO, $SiO_2$, $WO_3$, $MnO_2$, $In_2O_3$, $Al_2O_3$, and a combination thereof.

The particles can be made having a variety of sizes. The particles can be nanoparticles or microparticles. In some aspects, the particles are microparticles having a diameter of about 2 µm to 10 µm.

Compositions containing the particles are also provided. The compositions can include a plurality of the particles dispersed in a suitable binder. A variety of binders might be used depending upon the application. In some aspects, the binder includes a hydraulic or cementitious binder. For example, the binder can include Portland cement, high alumina cement, calcium aluminate cement, calcium sulfoaluminate cement, magnesium phosphate cement, magnesium potassium phosphate cement, activated fly ash, activated clay, and slag cement. In some aspects, the binder can include a polymeric resin. Suitable polymeric resins can include acrylic polymer resin, alkyd polymer resin, epoxy polymer resin, or a combination thereof. The compositions can include one or more additives, for example a filler, a pigment, an extender, a solvent, a dispersant, a silicone, a drying agent, a bactericide, a fungicide, a algaecide, an anti-foaming agent, or a combination thereof. The particles and compositions thereof can be used to make a variety of building materials such as cement based paints, roof tiles, or cement based concrete.

Encapsulation of a Thermochromic Material with $TiO_2$

In one example of particles that can obtain the desired reflective and self-cleaning properties during the daytime and night time periods, $TiO_2$ is used to encapsulate a thermochromic material. The thermochromic material can be used to produce surface color change and improve the surface reflective, emissive and radiative properties. Photocatalytic $TiO_2$ can be used to encapsulate the thermochromic material and thus: (a) protect the thermochromic materials from reacting with the environment (cement); and (b) enable the surface to destroy any organic pollutants that come in contact with the surface through the following reactions [16]:

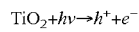
$TiO_2 + hv \rightarrow h^+ + e^-$

Oxidation reaction: $h^+ + OH^- \rightarrow OH.$
Reduction reaction: $e^- + O_2 \rightarrow O^-_{2ads}$

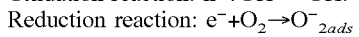
$OH. + VOC + O_2 \rightarrow nCO_2 + mH_2O$ $TiO_2$ does not react with cement.

Thermochromic Material

There are four types of thermochromic materials such as dye based, conjugated polymer, inorganic salt and metal oxides. The thermochromic organic material incorporates electron-donating for color former, electron acceptor as color developer and a solvent. Generally, the color former is called leuco dye (example: spirolacones, fluorans, crystal violet, thymolphthalein, spiropyrans). The color developer is generally hydroxybenzoates, 4, 4'-dihydroxydiphenyl propane, and hydroxycoumarin derivatives and lauryl gallate. The solvents are generally alcohol, phenol and ester derivatives [17]. Table 1 shows various materials used to develop leuco dye based thermochromic materials. The thermochromic materials can be synthesized using Crystal Violet Lactone, Lauryl Gallate and different solvents such as, N-Dimethylformamide (DMF), Arachidic Acid, Propylene Carbonate, Ethylene Carbonate, Dimethyl Sulphoxide, Tetrahydrofuran, N-Methylpyrrolidine, Triton, hexadecanol, and their combination.

The inorganic salt (e.g. silver mercury iodide, cuprous mercury iodide, bis(diethylammonium) tetrachloronickelate, benzimidazolium tetrachlorocuprate) changes color, different temperatures depending upon the composition of the material. The conjugated polymers (polyacetylenes polythiophenes, (poly 2-methoxy-5-(2-ethylhexyloxy-1,4-phenylenevinylene) are common thermochromic materials but are unsuitable for building applications because of UV degradation and environment instability. The metal oxides (aluminum oxide, zinc oxide, indium oxide, chromium (III)

oxide, vanadium oxides ($VO_2$, $V_2O_3$, $V_2O_5$, $V_6O_{11}$)) are common transition metal oxides thermochromic material due to their thermal behavior and semiconductor to metal phase transitions at different temperatures[18, 19]. With the exception of $VO_2$, most of the metal oxides have been used for high temperature applications.

From the available organic thermochromic materials, examples include the crystal violet lactone and the fluoran dyes. An inorganic metal salt thermochromic material can also be used, such as benimidazolelium tetrachlorocuprate, due to its stability. In addition, $VO_2$ can be used as a standard to compare the thermochromic properties of organic and inorganic salt based materials.

The thermochromic properties of dye based materials is lost if it is simply mixed with cement. Therefore, microencapsulation can be important to protect the thermochromic properties of the material when mixed with cement in paint or concrete applications. The microencapsulation also helps the durability of the material. Organic based thermochromic dyes are also unstable under UV-vis radiation. The microencapsulation of leuco dyes in a polymeric matrix has been attempted in the textile industry [20, 21].

Methods of Making Particles and Composition Thereof

Methods of making the particles are also provided. The methods can include dispersing a thermochromic material using a surfactant to form an aqueous dispersion; and adding a metal isopropoxide and a base to the dispersion to convert the metal isopropoxide into a corresponding metal oxide, thereby forming the particle having the thermochromic material in a core of the particle and the metal oxide in a shell encapsulating the core. Suitable surfactants can include quaternary ammonium surfactant such as cetyltrimethylammonium bromide. The dispersion can be created by forming a first solution containing the thermochromic material, surfactant, and an organic solvent such as 2-propanol; and combining the first solution with water to form the aqueous dispersion comprising the thermochromic material, surfactant, and organic solvent dispersed within the water. Converting the metal isopropoxide into the corresponding metal oxide can include reacting the metal isopropoxide and the base for a period of time from about 6 hours to 36 hours. Suitable bases can include, but are not limited to, ammonia and sodium hydroxide.

Figure 2:
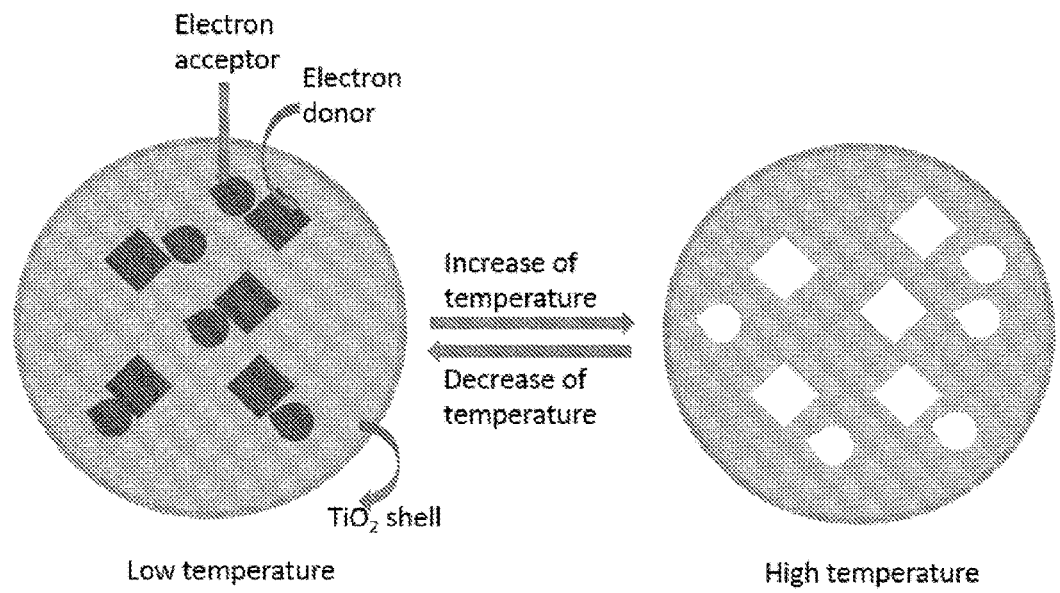
FIG. 2 shows the titanium oxide encapsulant with the thermochromic material.
Figure 3:
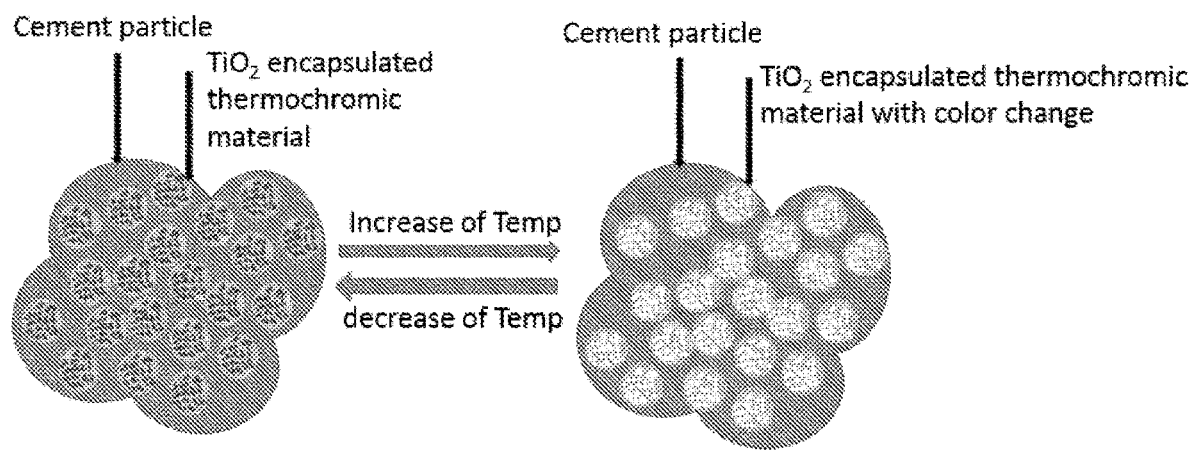
FIG. 3 shows cement that contains $TiO_2$ encapsulated thermochromic material: (left) shows the distribution of $TiO_2$ encapsulated thermochromic material in cement particles, and (right) shows the change of the $TiO_2$ encapsulated thermochromic material in cement as the temperature increases during day time.

We have already developed a method to encapsulate phase change materials with $SiO_2$. This method can be used with some variations to encapsulate thermochromic materials [22, 23]. Leuco dyes and inorganic salt based thermochromic materials can be used and encapsulated with metal oxide shells such as $TiO_2$. The thermal and optical properties of thermochromic materials mixed with cement can provide thermochromic responses in the 20-50° C. temperature range. FIG. 2 shows the titanium oxide ($TiO_2$) encapsulant with thermochromic materials containing electron donors and electron acceptors.

TABLE 1

Examples of important organic thermochromic materials

| Pigments | Color-developing agent | Solvent | Percentage | Ref |
|---|---|---|---|---|
| Crystal violet lactone | 4,4'-dihydroxydiphenyl propane | Phenol Alcohol | 1:5:30, | [24] |
| Crystal violet lactone | lauryl gallate, | Acetonitrile with acetic acid | 75-95 mol % solvent, | [25] |
| Crystal violet lactone | Lauryl gallate | 1-octadecanol | 1:6:40. | [26] |
| Crystal violet lactone | Propyl gallate, octyl gallate or lauryl gallate | 1-tetradecanol, 1-hexadecanol or 1-octadecanol | | [27] |
| Crystal violet lactone, 3,3-bis-(1-n-butyl-2-methyl-3-indolyl)-phthalide | Bisphenol A, Lauryl gallate, Ethylgallate and p-Hydroxybenzoic acid | 1-octanoic acid Methyl ester | Various ratios | [28] |
| Fluoran, Vinylphthalide, Luorene Crystal Violet lactone | Bisphenol A | Stearic acid, | 1:2:50 | [29] |
| Crystal Violet Lactone | Lauryl Gallate | Acetonitrile + Acetic acid | 1:3:40 | Our method |
| Crystal Violet Lactone | Lauryl Gallate | ,N-Dimethylformamide (DMF) | 1:3:40 | Our method |
| Crystal Violet Lactone | Lauryl Gallate | Arachidic Acid | 1:3:40 | Our method |
| Crystal Violet Lactone | Lauryl Gallate | Propylene Carbonate | 1:3:40 | Our method |
| Crystal Violet Lactone | Lauryl Gallate | Ethylene Carbonate | 1:3:40 | Our method |
| Crystal Violet Lactone | Lauryl Gallate | Dimethyl Sulphoxide (commercial) | 1:3:40 | Our method |
| Crystal Violet Lactone | Lauryl Gallate | Tetrahydrofuran | 1:3:40 | Our method |
| Crystal Violet Lactone | Lauryl Gallate | N-Methylpyrrolidine | 1:3:40 | Our method |
| Crystal Violet Lactone | Lauryl Gallate | Triton | 1:3:40 | Our method |

Synthesis and Characterization of Thermochromic Materials

Two leuco dyes (crystal violet lactone and Fuoran) and one inorganic salt as benimidazolelium tetrachlorocuprate thermochromic materials can be synthesized as described below. The standard tungsten doped VO₂ is selected for comparison of the organic and inorganic salt based thermochromic material. Organic based thermochromic primers can be crystal violet lactone and Fluoran.

a. Synthesis of the dye based material. Commercial leuco dyes (−5° C. to 60° C. with a change of temperature) are procured. The stoichiometry of a leuco dye is dependent on the acidity of developer (lauryl gallate), co-solvent acidity and compositions. The electron-donating phthalide in leuco dyes has reversible thermochromic properties and is dependent on the amount of lauryl gallate added to the dyes. So, various combinations of dye with developer and solvent are used. The solvent as fatty acid as well as alkyl alcohol are selected for developing the organic thermochromic property materials. Table 2 shows the chemicals and their structures used to synthesize thermochromic materials.

b. Synthesis of inorganic salt based thermochromic material: Various concentrations of hydrated copper chloride mixed with benzimidazole in hydrochloric acid solution can be prepared. The reactant is concentrated and later kept to crystallize benzimidazolium tetrachlorocuprate. The yellow to orange colors can be developed by changing the concentrations of the precursor 'hydrated copper chloride', and the developer 'benzimidazole' in hydrochloric acid [30].

c. Synthesis of tungsten doped VO₂: The tungsten doped VO₂ can be synthesized using the sol-gel technique. Tungsten doped VO₂ works well within a building's temperature range.

TABLE 2

Chemicals and their structures used to synthesize thermochromic materials

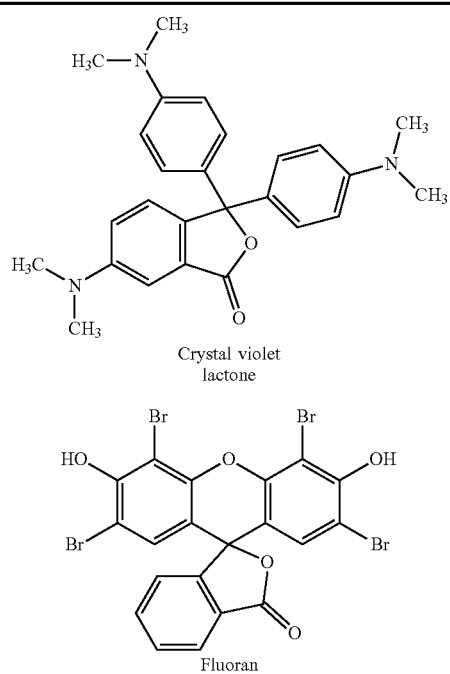

Crystal violet lactone

Fluoran

TABLE 2-continued

Chemicals and their structures used to synthesize thermochromic materials

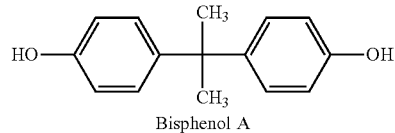

Bisphenol A

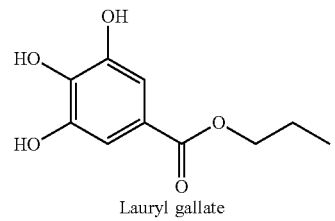

Lauryl gallate

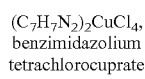

$(C_7H_7N_2)_2CuCl_4$, benzimidazolium tetrachlorocuprate

Encapsulation of Thermochromic Materials and Characterization

The microencapsulation techniques used are emulsion, vacuum metallization, liquid-wall microencapsulation, hydrothermal, spray drying, interfacial coacervation [20-23].

The TiO₂ encapsulation over the dye can be synthesized through a hydrothermal process and subsequent heat treatment in air using our earlier methods with modification [22, 23]. The leuco dyes are insoluble in water so they are well dispersed with the use of the surfactant cetyltrimethylammonium bromide (CTAB). The thermochromic material can be developed by dispersing in water with the addition of CTAB, using a 2-propanol solution in a round bottom flask. The solution is stirred and then heated for one hour. Next, titanium isopropoxide can be added dropwise to the solution, and the reaction continued for 30 minutes. The aqueous ammonia of sodium hydroxide at a concentration of 25 wt % is then added to the resulting solution and stirred for an additional 4 hours. The solution can be allowed to cool and mechanically stirred for 12 to 24 hrs. Subsequently, the precipitate is filtered, washed with alcohol, and dried at 100° C. to remove any moisture; later (depending on the melting temperature of the pigment), the precipitate is dried to remove any residual 2-propanol. This process produces a TiO₂ layer over the thermochromic material. The TiO₂ coated thermochromic material can be characterized using FTIR, thermal diffusivity, SEM and X-ray diffraction measurements.

However, the experiment such as encapsulation process with titanium oxide was made on thermochromic material which contained the solvent hexadecanol. The encapsulation of TiO₂ was performed over thermochromic material.

In one aspect, a TiO₂ encapsulation is accomplished via heating with magnetic stirring, followed by the addition of 50 ml of HCl 0.1M and 25 ml methanol. About 100 mg of CTAB surfactant is added, followed by the thermochromic material (TC) (1:3:40). The solution is stirred and then heated. Next, TiCl4 1 ml is added and the reaction continued. 2M NaOH 1 ml is then added to the resulting solution with stirring.

In a second aspect, a TiO₂ encapsulation is accomplished via heating at 60° C. with magnetic stirring followed by the addition of 50 ml of HCl 0.1M and 25 ml methanol. About 50 mg of CTAB surfactant is added and stirred for 30 minutes. Next 2M NaOH 1 ml is added as well as TiCl4 1 ml, and the reaction continued for 30 minutes. After 30 min Ti isopropoxide was added as well. After another 30 minutes, the thermochromic material (TC) (1:3:40) was added.

In a third aspect, a $TiO_2$ encapsulation is accomplished via heating at 60-70° C. with magnetic stirring followed by the addition of 50 ml of HCl 0.1M and 25 ml methanol. About 50 mg of CTAB surfactant is added along with 0.5M NaOH 1 ml and $TiCl_4$ 1 ml. After 30 min Ti isopropoxide was added as well. After another 30 minutes, the thermochromic material (TC) (1:3:40) was added. TC was mixed with polyethylene oxide to see if it would be protected from the encapsulation reaction In a fourth aspect, a $TiO_2$ encapsulation is accomplished via heating at 60-70° C. with magnetic stirring followed by the addition of 50 ml of HCl 0.1M and 25 ml methanol. About 50 mg of CTAB surfactant is added, followed by the thermochromic material (TC) (1:6:40). The TC was mixed with polyethylene oxide to see if it would be protected from the encapsulation reaction. TiCl4 1 ml was then added, followed by 0.5M NaOH 1 ml and the reaction was allowed to continue. After 30 min Ti isopropoxide was added as well.

In a fifth aspect, a $TiO_2$ encapsulation is accomplished via a method similar to the first aspects but halving the volume of solution, including heating at 45-55° C. with magnetic stirring. followed by the addition of 25 ml of HCl 0.1M and 12.5 ml methanol. About 50 mg of CTAB surfactant is added, followed by the thermochromic material (TC) (1:3:40) about 10 g. The solution is stirred and then heated. Next, $TiCl_4$ 0.5 ml is added and the reaction continued. 2M NaOH 2.5 ml is then added to the resulting solution with stirring.

In a sixth aspect, a $TiO_2$ encapsulation is accomplished via heating 25 ml of HCl 0.1M+12.5 ml methanol to 50° C. The liquid thermochromic material (TC) (1:3:40) is then added; around 8 ml with stirring. The surfactant 115 mg poly(styrene sulfonate) (PSS) is then added, followed by TiCl4 0.5 ml and 2M NaOH 2 ml. The beaker was then left and the reaction allowed to continue without heating for 3 hours and then put into condenser at 60° C. for 30 min.

In a seventh aspect, $TiO_2$ encapsulation is accomplished by combining 25 ml of HCl 0.1M+12.5 ml methanol, and then adding the thermochromic material (TC) (1:3:40); around 5 ml. The surfactant 50 mg poly(styrene sulfonate) (PSS) is then added, followed by TiCl4 0.5 ml and 2M NaOH 2 ml. The reaction is allowed to continue in a condenser for 20 min at 70° C.

In an eighth aspect, $TiO_2$ encapsulation is accomplished by combining 5 ml of HCl 0.1M+12.5 ml methanol with heating at 30° C. The liquid thermochromic material (TC) (1:3:40) is then added. The surfactant 115 mg poly(styrene sulfonate) (PSS) is then added, followed by $TiCl_4$ 0.5 ml and 2M NaOH 2 ml. The reaction was allowed to continue in a condenser at 60° C. for 70 min and the dried and filtered.

In a ninth aspect, $TiO_2$ encapsulation is accomplished by combining 5 ml of HCl 0.1M+12.5 ml methanol with heating at 30° C. The material produces from the eighth aspects is then added along with an additional 115 mg PSS surfactant followed by $TiCl_4$ 0.5 ml and 2M NaOH 2 ml. This reaction was put into a condenser at 80° C. for 30 min. The product as put into a beaker to cool and then filtered.

In a tenth aspect, $TiO_2$ encapsulation is accomplished by combining 5 ml of HCl 0.1M+12.5 ml methanol followed by 115 mg PSS surfactant. $TiCl_4$ 1 ml and 2M NaOH 3 ml are added along with the liquid thermochromic material (TC) (1:3:40); around 10 ml. The reaction was allowed to continue in a condenser at 80-90° C. for 70 min, poured into a beaker, and then filtered.

In an eleventh aspect, $TiO_2$ encapsulation is accomplished by combining 5 ml of HCl 0.1M+12.5 ml methanol followed by 115 mg PSS surfactant. The $TiCl_4$ 0.25 ml and 2M NaOH 1 ml is then added along with the product from the sixth aspect above. The reaction was then allowed to continue in a condenser at 80-90° C. for 70 min, poured into a beaker, and then filtered.

Optimization of Composition of Cement and Thermochromic Material, Coating and Characterization The thermochromic cement can be prepared by dispersing the encapsulated thermochromic material in cement. The cement containing thermochromic material can be coated over glass, slate and pebble. The amount of the material can be varied from 1% to 20% of the total weight of the cement. The compositions can include the surfactant and plasticizer flattening agents. The nickel and zinc based stabilizers, such as [3-(2-benzotriazolyl)-2-hydroxy-1-naphthoate], (2,4-dihydroxybenzophenone-3-carboxylates), [5-(2-benzotriazolyl)-2,4-dihydroxybenzoates], can be used as a stabilizer against the UV-light for the leuco dye based thermochromic material [31, 32]. The coating can be made by a number of techniques, such as roller, brush coating, etc. Color change temperatures from 20° C. to 50° C. can be prepared using suitable leuco dye based thermochromic pigments.

Methods of Using Particles and Compositions Thereof

Methods of using the particles and compositions are also provided. For example, a method of cleaning a building or other surface are provided. The methods can include removing volatile organic carbons from the material. By radiating a composition or particle provided herein with a light source, the metal oxide can be excited to produce a radical. The radical can react with the volatile organic carbon to oxidize the volatile organic carbon, for example to produce $H_2O$, $CO_2$, a combination thereof, or a combination thereof with one or more additional decomposition products. The excitation can be achieved by ultraviolet radiation, as for example UV light contained in solar radiation. The ultraviolet radiation excites electrons in a metal oxide, such as $TiO_2$, and react with water molecules in the air to produce radical species such as —OH, $.O_2^-$, or a combination thereof.

Thermal and Reflective Properties of a Thermochromic Coatings

Reflection measurements can follow the Byk model Dospermat N1 disperser with cowls disk test with a paint coating of ~75 μm on various surfaces [33]. The UV-vis spectrophotometer can be used to measure the reflectance of various samples. The experimental setup for temperature measurements used IR lamps irradiating the coated plates. The temperature measured using a temperature sensor can indicate the thermal and reflective properties of the coated surface. The temperature of the surface exposed to a thermal environment (a thermal lamp) can be measured by a temperature sensor as a function of time. The increase in the coated surface temperature can affect the reflectivity and thermal insulation of the coated surface. In addition, IR imaging can be performed to determine the temperature profile at various temperatures. Spectral reflectance measurement at different sample temperatures are made to understand any changes in coatings of the same color [7].

Self-Cleaning Tests of Cement—Thermochromic Coating

Figure 4:
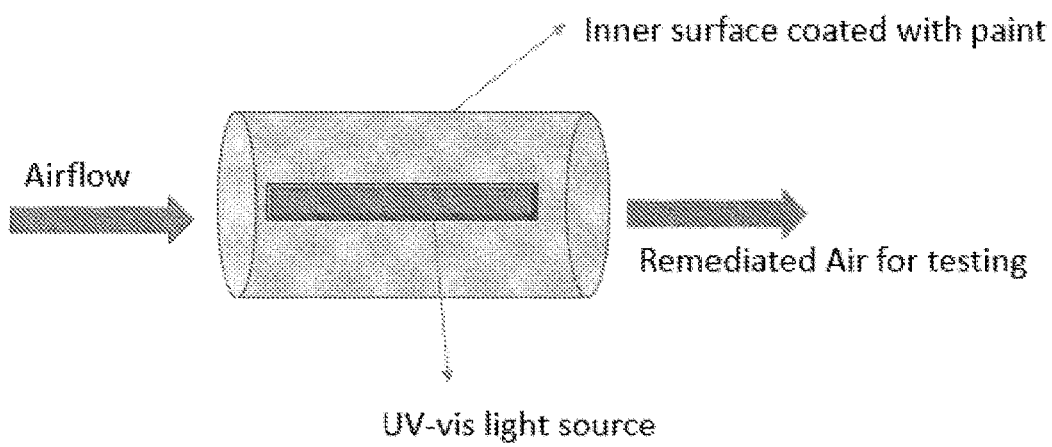
FIG. 4 shows a schematic of the apparatus that can be used to test gas remediation by the $TiO_2$ encapsulated thermochromic paint coating the interior surface of a hollow cylinder.

The test chamber can be designed using a set up similar to that proposed by Mo et al [16]. The inner surface of the cylinder can be coated with the cement—thermochromic coating material. The airflow with known toluene or other gases can be used as inlet gas, and remediated air is tested as a function of time using gas chromatography. FIG. 4 shows a schematic of the setup that can be used for gas remediation by the cylinder interior surface coating.

EXAMPLES

Now having described the embodiments of the present disclosure, in general, the following examples describe some additional embodiments. While embodiments of the present disclosure are described in the following examples and corresponding text and figures, there is no intent to limit the embodiments of the present disclosure to this descriptions. On the contrary, the intent is to cover all alternatives, modifications, and equivalents included within the spirit and scope of embodiments of the present disclosure.

Example 1: Thermochromic Experimental Results

Experimental Results

The microencapsulated (e.g. $TiO_2$ coated) thermochromic material has been characterized using FTIR, UV-vis and thermal heating tests.

Figure 1B:
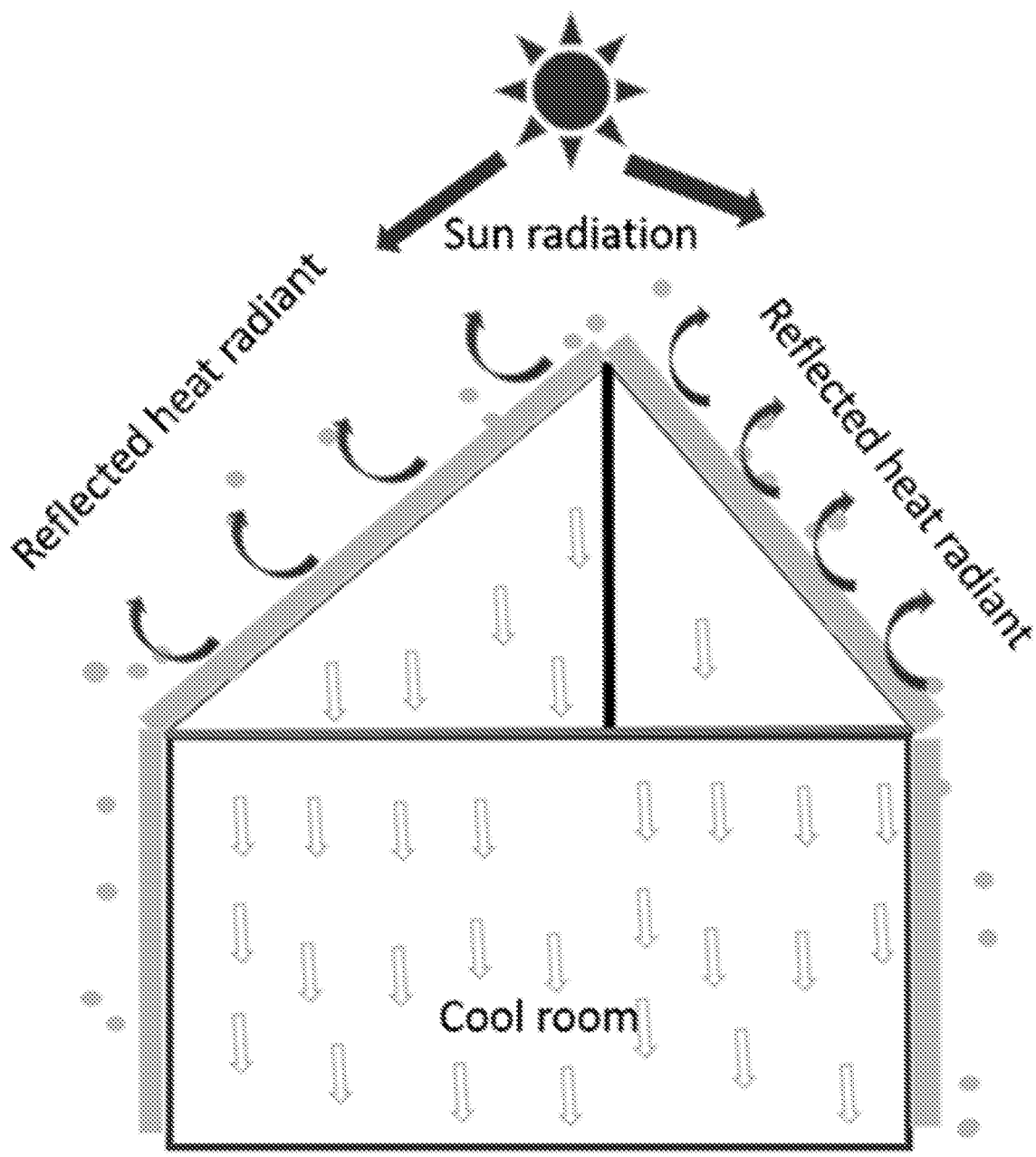
Figure 5:
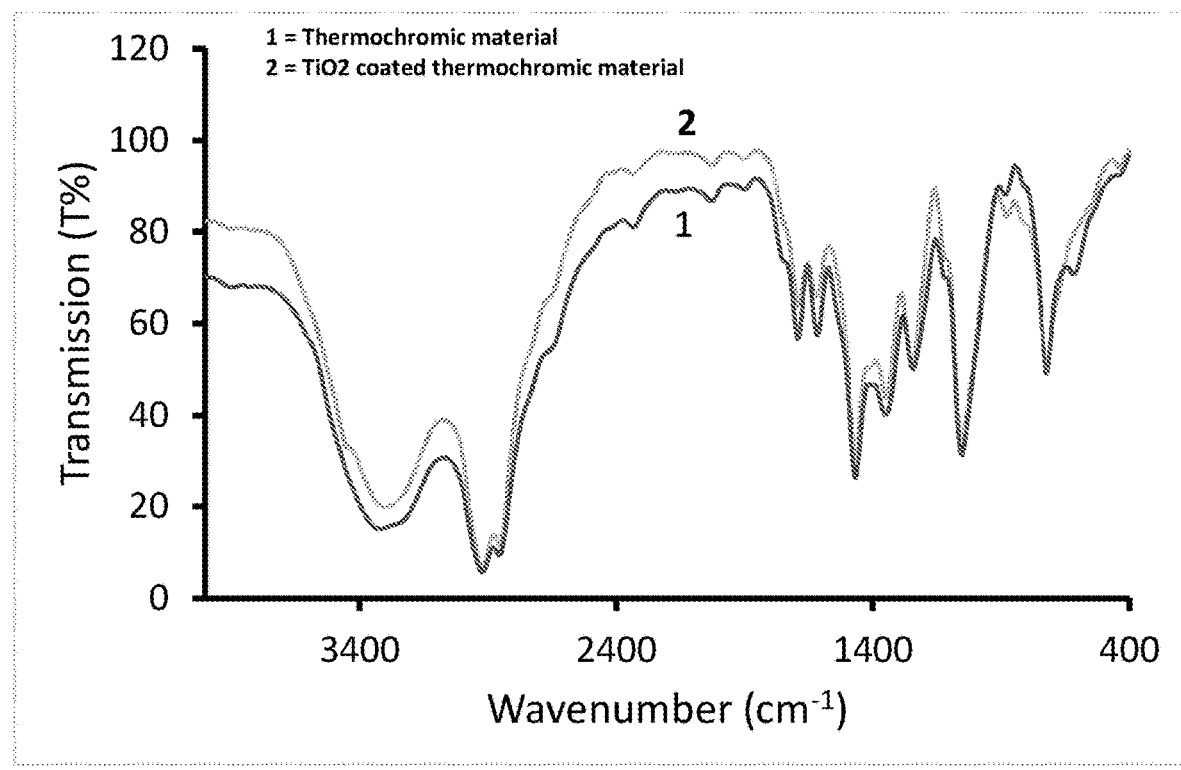
FIG. 5 shows the FTIR spectra of: curve 1 (thermochromic material) and curve 2 ($TiO_2$ coated (encapsulated) thermochromic material).

The thermochromic and $TiO_2$ coated (encapsulated) thermochromic materials are used to measure the Fourier transform infrared spectrometer (FTIR) spectra. FIG. 5 (curve 1) shows the FTIR characteristics peaks of the thermochromic material at 3893, 3322, 3228, 2921, 2850, 2640, 2484, 2421, 2327, 2031, 1894, 1445, 1689, 1689, 1641, 1465, 1310, 1244, 1105, 1055, 874, 813, 614, 544 and 477 $cm^{-1}$. FIG. 5 (curve 2) shows the FTIR spectra of $TiO_2$ coated thermochromic material. FIG. 1 (curve 1) shows infrared bands at 3893, 3322, 3228, 2921, 2850, 2640, 2484, 2421, 2327, 2031, 1894, 1745, 1689, 1689, 1641, 1465, 1404, 1310, 1244, 1105, 1055, 874, 803, 685, 544 and 477 $cm^{-1}$. The band at 3476 $cm^{-1}$ is due to hydroxyl group which is linked to $Ti^{4+}$—OH vacancies. The bands at 803 and 685 are due to Ti—O and Ti—O—Ti indicating the presence of the $TiO_2$ encapsulating the thermochromic material.

Figure 6:
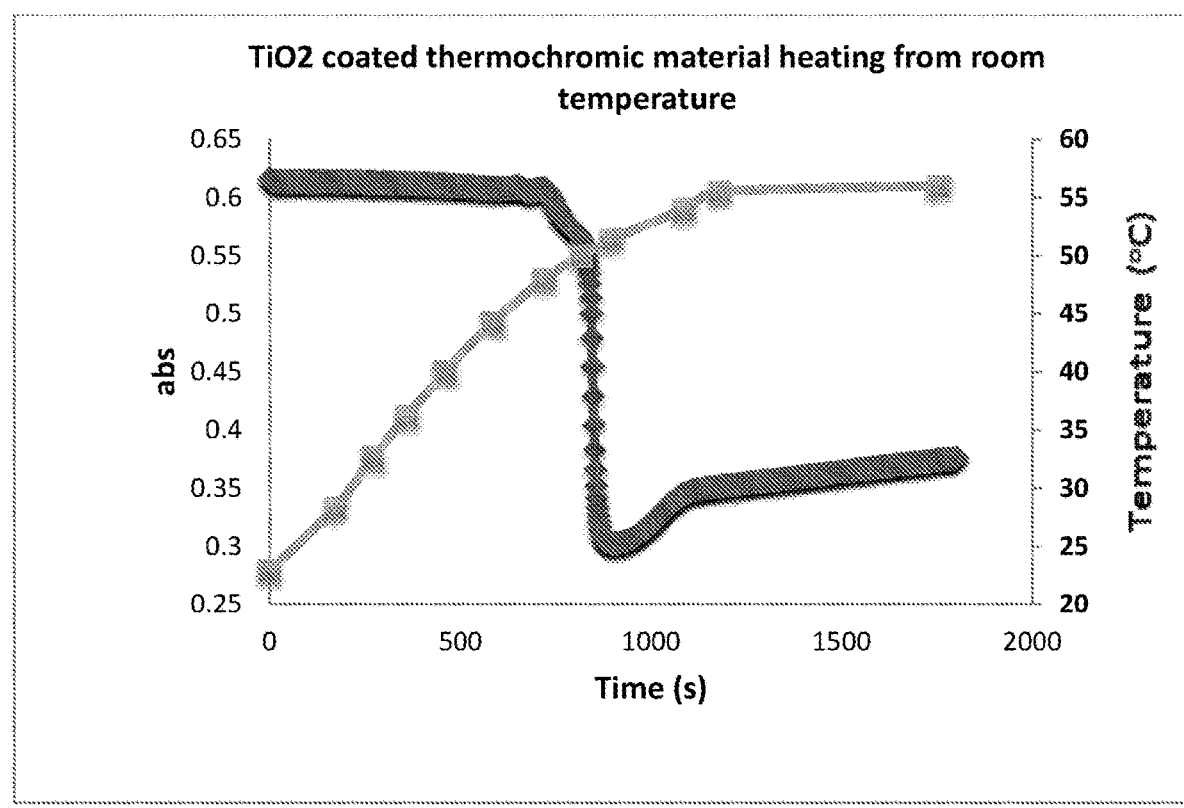
FIG. 6 shows a $TiO_2$ encapsulated thermochromic film on glass as a function of temperature, at 550 nm wavelength of light, showing the change in the absorption magnitude.

FIG. 6 shows the change in the absorption curve at 550 nm of the $TiO_2$ microencapsulated thermochromic film on glass as a function of temperature. The absorption magnitude changes from ~0.6 to ~0.3 at a temperature of ~50° C. However, we have observed that the change in absorption at 550 nm can vary from 30-50° C. in various other encapsulated thermochromic materials.

Figure 7:
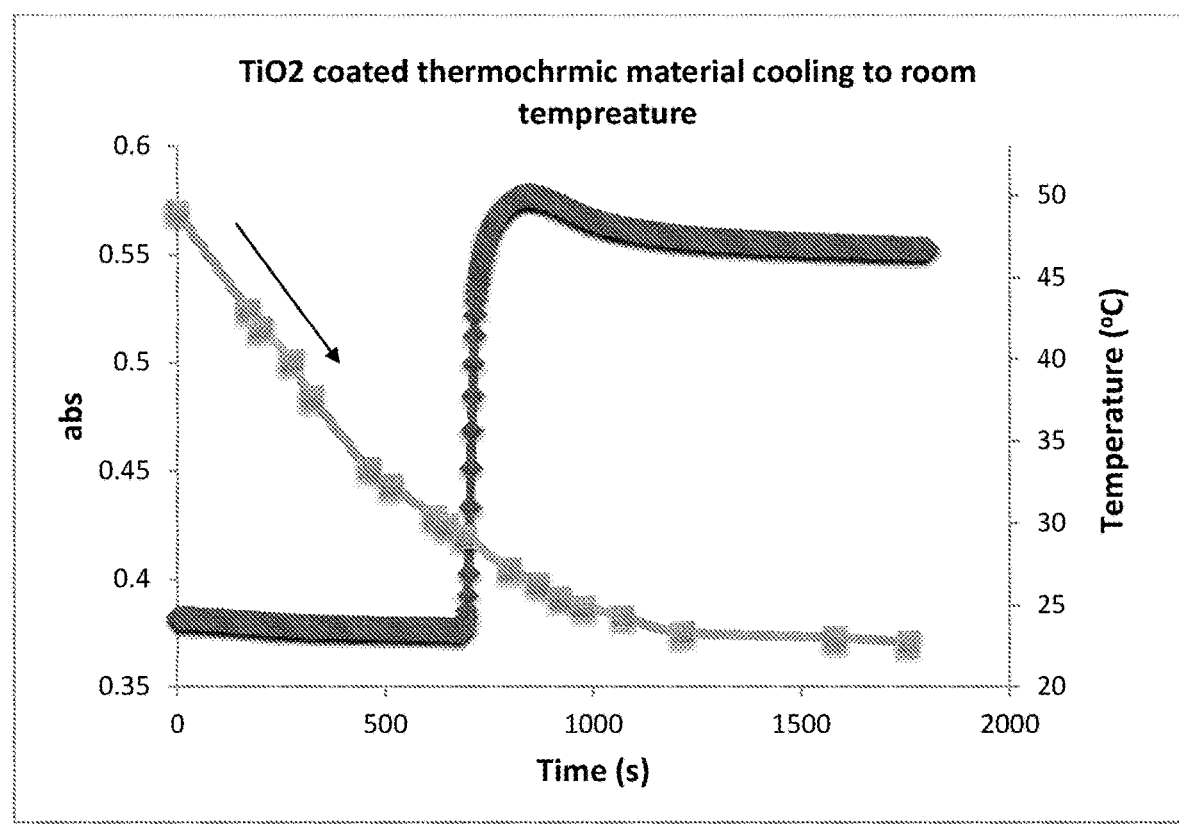
FIG. 7 shows a $TiO_2$ coated thermochromic film on glass cooled at a 550 nm light wavelength showing the change (increase) in the absorption magnitude with decrease in temperature.

FIG. 7 shows the change in the absorption magnitude at 550 nm as the temperature of the encapsulated thermochromic film is cooled to room temperature. There is an increase in the absorption magnitude as the temperature decreases from ~50° C. to room temperature.

The $TiO_2$ encapsulated thermochromic material was applied to a filter paper and heated from room temperature to 50° C. The color of the $TiO_2$ coated thermochromic material on filter paper changed from dark blue green to light yellow when heated from room temperature to 50° C. The color change was observed to be completely reversible.

$TiO_2$ Encapsulated Thermochromic Material

The thermochromic behavior and the stability of the $TiO_2$ coated thermochromic material is dependent on the thickness of the encapsulating layer. The thickness of the encapsulating material can be increased by applying 2 or 3 layers (multiple $TiO_2$ encapsulating layers).

Metal Oxide Encapsulants of Thermochromic Materials

In addition to $TiO_2$, a number of metal oxides such as zinc oxide (ZnO), silicon oxide ($SiO_2$), tungsten oxide ($WO_3$), manganese oxide ($MnO_2$), indium oxide ($In_2O_3$), aluminum oxide ($Al_2O_3$), or combinations of metal oxides can be used for encapsulating thermochromic materials using our method.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

REFERENCES

1. Karlessi, T., M. Santamouris, and A. Synnefa. Thermochromic energy efficient coatings for buildings and urban structures. Second International Conference on Countermeasures to Urban Heat Islands. 2009.
2. Sivak, M., *Will AC put a chill on the global energy supply?* American Scientist, 2013. 101(5): p. 330.
3. Synnefa, A., et al. An energy efficient solution to mitigate heat islands and reduce cooling energy loads. in Proceedings of the international conference of Sustainable Buildings. 2007.
4. Synnefa, A., M. Santamouris, and H. Akbari, Estimating the effect of using cool coatings on energy loads and thermal comfort in residential buildings in various climatic conditions. Energy and Buildings, 2007. 39(11): p. 1167-1174.
5. Synnefa, A., M. Santamouris, and K. Apostolakis, On the development, optical properties and thermal performance of cool colored coatings for the urban environment. Solar Energy, 2007. 81(4): p. 488-497.
6. Santamouris, M., A. Synnefa, and T. Karlessi, Using advanced cool materials in the urban built environment to mitigate heat islands and improve thermal comfort conditions. Solar Energy, 2011. 85(12): p. 3085-3102.
7. Karlessi, T., et al., Development and testing of thermochromic coatings for buildings and urban structures. Solar Energy, 2009. 83(4): p. 538-551.
8. Synnefa, A., M. Santamouris, and I. Livada, *A study of the thermal performance of reflective coatings for the urban environment.* Solar Energy, 2006. 80(8): p. 968-981.
9. Kiria, P., G. Hyettb, and R. Binionsa, *Solid state thermochromic materials.* Adv. Mat. Lett, 2010. 1(2): p. 86-105.
10. Granqvist, C., *Window coatings for the future.* Thin solid films, 1990. 193: p. 730-741.
11. Boh, B. and B. Sumiga, Microencapsulation technology and its applications in building construction materials Tehnologija mikrokapsuliranja in njena uporaba v gradbenih materialih. RMZ-Materials and Geoenvironment, 2008. 55(3): p. 329-344.
12. Ma, Y., B. Zhu, and K. Wu, Preparation and solar reflectance spectra of chameleon-type building coatings. Solar Energy, 2001. 70(5): p. 417-422.
13. Fujita, K. and K. Senga, *Thermochromic microencapsulated pigments.* 2002, Google Patents.
14. Novinson, T., *Reversible thermochromic pigments.* 1996, Google Patents.
15. Mehta, R., R. L. Shields, and A. G. W. Kalman, *Thermochromic ink composition.* 2002, Google Patents.
16. Mo, J., et al., Influence of fins on formaldehyde removal in annular photocatalytic reactors. Building and Environment, 2008. 43(3): p. 238-245.

17. Kurčar, R., et al., *Colorimetric properties of reversible thermochromic printing inks.* Dyes and pigments, 2010. 86(3): p. 271-277.
18. Perucchi, A., et al., *Optical properties across the insulator to metal transitions in vanadium oxide compounds.* Journal of Physics: Condensed Matter, 2009. 21(32): p. 323202.
19. Held, K., et al., Mott-Hubbard Metal-Insulator Transition in Paramagnetic V 2 O 3: An L D A+D M F T (QMC) Study. Physical review letters, 2001. 86(23): p. 5345.
20. Naito, K., Amorphous-crystal transition of organic dye assemblies: Application to rewritable color recording media. Applied physics letters, 1995. 67(2): p. 211-213.
21. Mauguet, M., et al., *Gliadin matrices for microencapsulation processes by simple coacervation method.* Journal of microencapsulation, 2002. 19(3): p. 377-384.
22. Ram, M. K., et al., Method of encapsulating a phase change material with a metal oxide. 2014, Google Patents.
23. Ram, M. K., et al., Microencapsulated dimethyl terephthalate phase change material for heat transfer fluid performance enhancement. International Journal of Energy Research, 2016.
24. Ma, Y. and B. Zhu, Research on the preparation of reversibly thermochromic cement based materials at normal temperature. Cement and Concrete Research, 2009. 39(2): p. 90-94.
25. MacLaren, D. C. and M. A. White, Dye-developer interactions in the crystal violet lactone-lauryl gallate binary system: implications for thermochromism. Journal of Materials Chemistry, 2003. 13(7): p. 1695-1700.
26. MacLaren, D. C. and M. A. White, Competition between dye-developer and solvent-developer interactions in a reversible thermochromic system. Journal of Materials Chemistry, 2003. 13(7): p. 1701-1704.
27. MacLaren, D. and M. White, *Design rules for reversible thermochromic mixtures.* Journal of materials science, 2005. 40(3): p. 669-676.
28. Seeboth, A., et al., *Thermochromic effects of leuco dyes studied in polypropylene.* Chinese journal of polymer science, 2006. 24(04): p. 363-368.
29. Burkinshaw, S. and A. Towns, *Reversibly thermochromic systems based on pH-sensitive functional dyes.* Journal of materials chemistry, 1998. 8(12): p. 2677-2683.
30. Bhattacharya, R., et al., Synthesis, crystal structure and thermochromism of benzimidazolium tetrachlorocuprate:(C 7 H 7 N 2) 2 [CuCl 4]. Polyhedron, 2002. 21(25): p. 2561-2565.
31. Oda, H., New developments in the stabilization of leuco dyes: effect of UV absorbers containing an amphoteric counter-ion moiety on the light fastness of color formers. Dyes and pigments, 2005. 66(2): p. 103-108.
32. Oda, H., Photostabilization of organic thermochromic pigments. Part 2: Effect of hydroxyarylbenzotriazoles containing an amphoteric counter-ion moiety on the light fastness of color formers. Dyes and pigments, 2008. 76(2): p. 400-405.
33. Coser, E., et al., Development of paints with infrared radiation reflective properties. Polimeros, 2015. 25(3): p. 305-310.

We claim:

1. A composition comprising a plurality of particles, each of which comprises:
    a thermochromic core that includes one or both of an organic thermochromic material and an inorganic salt thermochromic material; and
    a metal oxide shell encapsulating the thermochromic core, wherein the plurality of particles is dispersed in a Portland cement, and
    wherein the composition is a paint.
2. The composition according to claim 1, wherein the metal oxide shell comprises a metal oxide selected from the group consisting of titanium dioxide ($TiO_2$), zinc oxide (ZnO), silicon oxide ($SiO_2$), tungsten oxide ($WO_3$), manganese oxide ($MnO_2$), indium oxide ($In_2O_3$), aluminum oxide ($Al_2O_3$), iron oxide ($Fe_2O_5$), molybdenum oxide ($MoO_2$), and a combination thereof.
3. The composition according to claim 1, wherein the thermochromic core comprises an organic thermochromic material that includes a dye, a color developer, and a solvent.
4. The composition according to claim 3, wherein the dye is selected from the group consisting of a crystal violet lactone dye, a fluoran dye, and a combination thereof.
5. The composition according to claim 4, wherein the color developer is selected from the group consisting of a hydroxybenzoate, a 4, 4'-dihydroxydiphenyl propane, a hydroxycoumarin derivative, a lauryl gallate, and a combination thereof.
6. The composition according to claim 4, wherein the solvent is selected from the group consisting of an alcohol, a phenol, an ester, and a mixture thereof.
7. The composition according to claim 1,
    wherein the thermochromic core comprises an organic thermochromic material;
    wherein the organic thermochromic material comprises
        (i) a dye selected from the group consisting of a crystal violet lactone dye, a fluoran dye, and a combination thereof;
        (ii) a color developer selected from the group consisting of a hydroxybenzoate, a 4, 4'-dihydroxydiphenyl propane, a hydroxycoumarin derivative, a lauryl gallate, and a combination thereof; and
        (iii) a solvent selected from the group consisting of an alcohol, a phenol, an ester, and a mixture thereof; and
    wherein the metal oxide shell comprises $TiO_2$.
8. The composition according to claim 1, wherein the thermochromic core comprises an inorganic salt thermochromic material.
9. The composition according to claim 1, wherein the thermochromic core comprises an inorganic salt thermochromic material selected from the group consisting of silver mercury iodide, cuprous mercury iodide, bis(diethylammonium) tetrachloronickelate, benzimidazolium tetrachlorocuprate, and a combination thereof; and
    wherein the metal oxide shell comprises $TiO_2$.
10. A composition comprising a plurality of particles, each of which comprises:
    a thermochromic core that includes one or both of an organic thermochromic material and an inorganic salt thermochromic material; and
    a metal oxide shell encapsulating the thermochromic core, wherein the plurality of particles is dispersed in a binder that is a hydraulic binder or a cementitious binder.
11. The composition according to claim 10, wherein the metal oxide shell comprises a metal oxide selected from the group consisting of titanium dioxide (TiO2), zinc oxide (ZnO), silicon oxide ($SiO_2$), tungsten oxide ($WO_3$), manganese oxide ($MnO_2$), indium oxide (In2O3), aluminum oxide ($Al_2O_3$), iron oxide ($Fe_2O_5$), molybdenum oxide ($MoO_2$), and a combination thereof.
12. The composition according to claim 10, wherein the thermochromic core comprises an organic thermochromic material.

13. The composition according to claim 12, wherein the organic thermochromic material comprises a dye, a color developer, and a solvent.

14. The composition according to claim 13, wherein the dye is selected from the group consisting of a crystal violet lactone dye, a fluoran dye, and a combination thereof.

15. The composition according to claim 13, wherein the color developer is selected from the group consisting of a hydroxybenzoate, a 4, 4'-dihydroxydiphenyl propane, a hydroxycoumarin derivative, a lauryl gallate, and a combination thereof.

16. The composition according to claim 13, wherein the solvent is selected from the group consisting of an alcohol, a phenol, an ester, and a mixture thereof.

17. The composition according to claim 10, wherein the thermochromic core comprises an organic thermochromic material;
wherein the organic thermochromic material comprises
a. a dye selected from the group consisting of a crystal violet lactone dye, a fluoran dye, and a combination thereof;
b. a color developer selected from the group consisting of a hydroxybenzoate, a 4, 4'-dihydroxydiphenyl propane, a hydroxycoumarin derivative, a lauryl gallate, and a combination thereof; and
c. a solvent selected from the group consisting of an alcohol, a phenol, an ester, and a mixture thereof; and
wherein the metal oxide shell comprises $TiO_2$.

18. The composition according to claim 10, wherein the thermochromic core comprises an inorganic salt thermochromic material.

19. The composition according to claim 18, wherein the inorganic salt thermochromic material is selected from the group consisting of silver mercury iodide, cuprous mercury iodide, bis(diethylammonium) tetrachloronickelate, benzimidazolium tetrachlorocuprate, and a combination thereof.

20. The composition according to claim 10, wherein the thermochromic core comprises an inorganic salt thermochromic material;
wherein the inorganic salt thermochromic material is selected from the group consisting of silver mercury iodide, cuprous mercury iodide, bis(diethylammonium) tetrachloronickelate, benzimidazolium tetrachlorocuprate, and a combination thereof; and
wherein the metal oxide shell comprises $TiO_2$.

21. The composition according to claim 10, wherein a particle has a radius of about 2 μm to 10 μm.

22. A method of removing a volatile organic carbon from a building material that comprises a plurality of particles, wherein each particle includes:
a thermochromic core comprising one or both of an organic thermochromic material and an inorganic salt thermochromic material; and
a metal oxide shell encapsulating the thermochromic core;
the method comprising:
radiating the building material with light from a light source to excite metal oxide in the metal oxide shell to produce a radical, and
reacting the radical with the volatile organic carbon to oxidize the volatile organic carbon.

* * * * *